United States Patent
Yu et al.

(10) Patent No.: US 7,755,317 B2
(45) Date of Patent: Jul. 13, 2010

(54) METHODS FOR ELECTRIC VEHICLE MOTOR CONTROL AND ROTOR POSITION DETECTION FAULT-TOLERANT PROCESSING

(75) Inventors: Ming Yu, Shanghai (CN); Xiaohua Tang, Shanghai (CN); Nan Liu, Shanghai (CN); Jian Gong, Shanghai (CN); Yingwu Xu, Shanghai (CN); Ting Luo, Shanghai (CN); Kai Liu, Shanghai (CN); Xianhong Jiang, Shanghai (CN); Qiaoqiao Wu, Shanghai (CN); Xuguang Zhou, Shanghai (CN); Guangming Yang, Shanghai (CN)

(73) Assignee: BYD Company Limited, Shenzhen (CN)

( * ) Notice: Subject to any disclaimer, the term of this patent is extended or adjusted under 35 U.S.C. 154(b) by 252 days.

(21) Appl. No.: 11/951,305

(22) Filed: Dec. 5, 2007

(65) Prior Publication Data

US 2008/0129241 A1      Jun. 5, 2008

(30) Foreign Application Priority Data

Dec. 5, 2006   (CN)  .......................... 2006 1 0157298
Aug. 30, 2007  (CN)  .......................... 2007 1 0076826

(51) Int. Cl.
H02H 7/08  (2006.01)
(52) U.S. Cl. ....................... 318/721; 318/638; 318/637; 318/671; 318/400.04; 318/400.32; 361/23; 361/31
(58) Field of Classification Search ................... 361/23; 341/111, 112, 115; 318/661, 638, 637, 721, 318/671, 400.04, 400.32
See application file for complete search history.

(56) References Cited

U.S. PATENT DOCUMENTS

| | | | | |
|---|---|---|---|---|
| 4,710,770 A * | 12/1987 | Hakata et al. | .......... | 340/870.18 |
| 5,382,899 A * | 1/1995 | Funatsu et al. | ......... | 324/207.18 |
| 5,552,682 A * | 9/1996 | Ushikoshi | .............. | 318/400.38 |
| 5,721,546 A * | 2/1998 | Tsutsumishita | ............. | 341/116 |
| 5,844,388 A * | 12/1998 | Maiocchi | ................ | 318/400.12 |
| 6,191,550 B1 * | 2/2001 | Yoshihara | ................... | 318/661 |
| 6,556,153 B1 * | 4/2003 | Cardamone | ................. | 341/111 |
| 6,583,593 B2 * | 6/2003 | Iijima et al. | ............ | 318/400.32 |
| 6,700,343 B2 * | 3/2004 | Masaki et al. | .............. | 318/434 |
| 7,116,070 B2 * | 10/2006 | MacKay | ................ | 318/400.11 |
| 7,122,985 B2 * | 10/2006 | Kikuchi | ................. | 318/400.34 |
| 7,388,527 B2 * | 6/2008 | Kushihara | .................... | 341/114 |
| 7,538,700 B2 * | 5/2009 | Nagamoto | ................... | 341/115 |

* cited by examiner

*Primary Examiner*—Rita Leykin
(74) *Attorney, Agent, or Firm*—Venture Pacific Law, PC

(57) ABSTRACT

This invention provides methods for electric vehicle motor control and rotor position detection and fault-tolerant processing. The rotor position signal sampled by the system is compared with the previous rotor position $\theta_0$. When there is a sudden change, the current position signal acquired is discarded. Instead, a fault-tolerant processing strategy for use during an error condition is employed where the previous sampled rotor position $\theta_0$ is used as a base to determine the corrected current rotor position angle $\Theta_1'$. Then the correcting value is used to control the electric motor. Thus, during the motor operation, when the detection of the motor rotor position is erroneous because of a sensor such as a revolver that may be interfered by external conditions such as electromagnetic fields or vibrations or when there is a breakdown in other related hardware components or transmitting circuits, the fault-tolerant processing methods of this invention can effectively prevent the motor from losing control and allow it to maintain its continuity and stability.

18 Claims, 5 Drawing Sheets

METHODS FOR ELECTRIC VEHICLE MOTOR CONTROL AND ROTOR POSITION DETECTION FAULT-TOLERANT PROCESSING

CROSS REFERENCE

This application claims priority from a Chinese patent application entitled "A Type of Rotor Position Control Methods and Devices" filed on Aug. 30, 2007, having a Chinese Application No. 200710076826.6; and from a Chinese patent application entitled "Methods for Electric Vehicle Motor Control and Rotor Position Detection Fault-Tolerant Processing" filed on Dec. 5, 2006, having a Chinese Application No. 200610157298.2. These Chinese applications are incorporated herein by reference.

FIELD OF INVENTION

This invention involves methods related to motor rotor, and, in particular, to detection of motor rotor position and to fault-tolerant processing with respect to the motor and motor rotor.

BACKGROUND

During the motor rotor control process, it is necessary to detect the rotor position. The existing technology uses a revolver to detect rotor rotational position and send out a simulation signal. The digital signal quantity is calculated through a specific decoding chip. The vehicle speed can be calculated by the ECU of the electric vehicle based on the current position signal and the previous position signal. Moreover, the necessary increase in driver voltage for the electric motor rotor can be computed. Through these procedures, the driver signal for the revolver can be determined. Thus the revolver can provide the preset three-phase AC voltage to the stator winding of the electric motor based on the driver signal.

However, since other unpreventable external electromagnetic interferences can cause the rotor position data to have a greater error or even be incorrect, if the electric motor control ECU does not further check the position signal and provide the control signal based on the current sampled position signal, it can be very dangerous and may lead to serious consequences. But at the same time, the ECU must also exert control over the electric motor. If the current data is discarded and the control of the electric motor ceases, it can also cause the electric motor to lose control. Thus, it is necessary to have control methods that are continual and reasonable in managing these potential situations when they occur.

Furthermore, in automobile production, it is easy to make a mistake in positioning the angle of the revolver used to detect the position of the motor rotor. In the process of dealing with an erroneous revolver position angle, the revolver position angle needs to be examined. The existing technology solves the issue by comparing the last sampled position angle with the current position angle to determine if the difference is within a reasonable range. Since the electric motor rotor position angle cannot have a large increase occurring within a short period of time, thus it can determine whether the current sampled rotor position is correct or not.

If the position angle signal changes suddenly, then the sampled position angle is considered incorrect and the current sampled position angle signal is discarded. Then a different strategy is employed to deal with the erroneous angle where a correct speed value obtained based on the last sampled rotor position is used to correct the current sampled speed value resulting in a corrected current rotor position angle. Lastly the correcting value is used to control the electric motor.

When the motor rotor position continues to be in error, although this type of method can process the rotor error, but in this process, the accumulated errors resulted from the calculations for the rotor positions may lead to a larger difference between the correct rotor position sampled after the revolver returns to normal operation and the related calculated rotor position. If this particular sampled correct rotor position is used to control the motor, then the motor rotation speed may have a increase that can lead to an overly large electric current resulting in damage to power components.

SUMMARY

The main purposes of this invention are: to provide safe, stable, and reasonable motor control methods and motor rotor position detection fault-tolerant processing methods. When the electric vehicle motor rotor position detection is faulty, these methods can still determine a corresponding correct and reasonable stator voltage control strategy to prevent the electric motor operation from unsafe conditions such as motor fluctuation or loss of control.

In an electric vehicle equipped with this invention, the electric motor control ECU uses the current rotor position angle $\theta_1$ to compare with the previous rotor position angle $\theta_0$ to determine if the difference is within a reasonable range. Since the electric motor rotor position cannot tolerate a sizable increase within a short period of time, therefore, it can determine whether the current sampled rotor position is correct or not. If there is a sudden change in the rotor position, the sampled position signal is determined to be in error and it is discarded. Then a fault-tolerant processing strategy is employed where the previous sampled rotor position $\theta_0$ is used as a base to determine the corrected current rotor position angle $\theta_1'$. Then a correcting value is used to control the electric motor. Thus, during the motor operation, when the detection of the motor rotor position is in error due to reasons such as when a sensor such as a revolver that is interfered by external conditions like electromagnetic fields or vibrations or when there is a breakdown in related hardware components or transmitting circuits, the fault-tolerant processing strategy of this invention can ensure safe operation by effectively preventing the motor from losing control and allow it to maintain its continuity and stability.

Another purpose of the invention is to provide a type of motor rotor position control device. Said device include a correct rotor position comparing module that is used to compare the sampled correct rotor position and the calculated rotor position obtained when there is an error. It determines whether the difference between the sampled correct rotor position and the calculated rotor position obtained when there is an error is greater than the specified motor rotor position limit.

DESCRIPTION OF FIGURES

The foregoing and other objects, aspects and advantages of the invention will be better understood from the following detailed description of the preferred embodiments of this invention when taken in conjunction with the accompanying drawings in which.

DETAILED DESCRIPTIONS OF THE PREFERRED EMBODIMENTS

Figure 1:
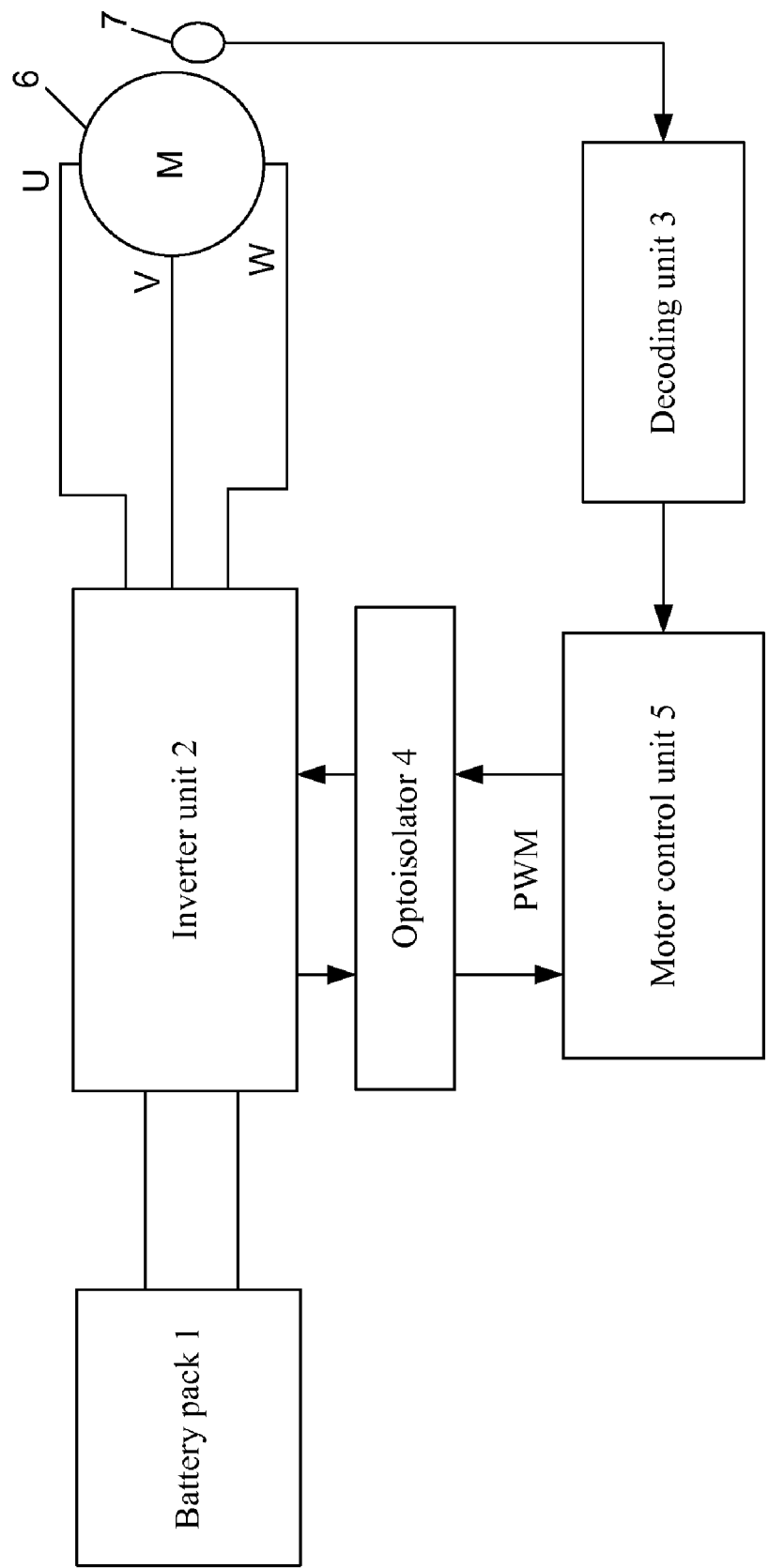
FIG. 1 is a simplified structural diagram for the electric vehicle electric driver system of an embodiment of this invention.
Figure 2:
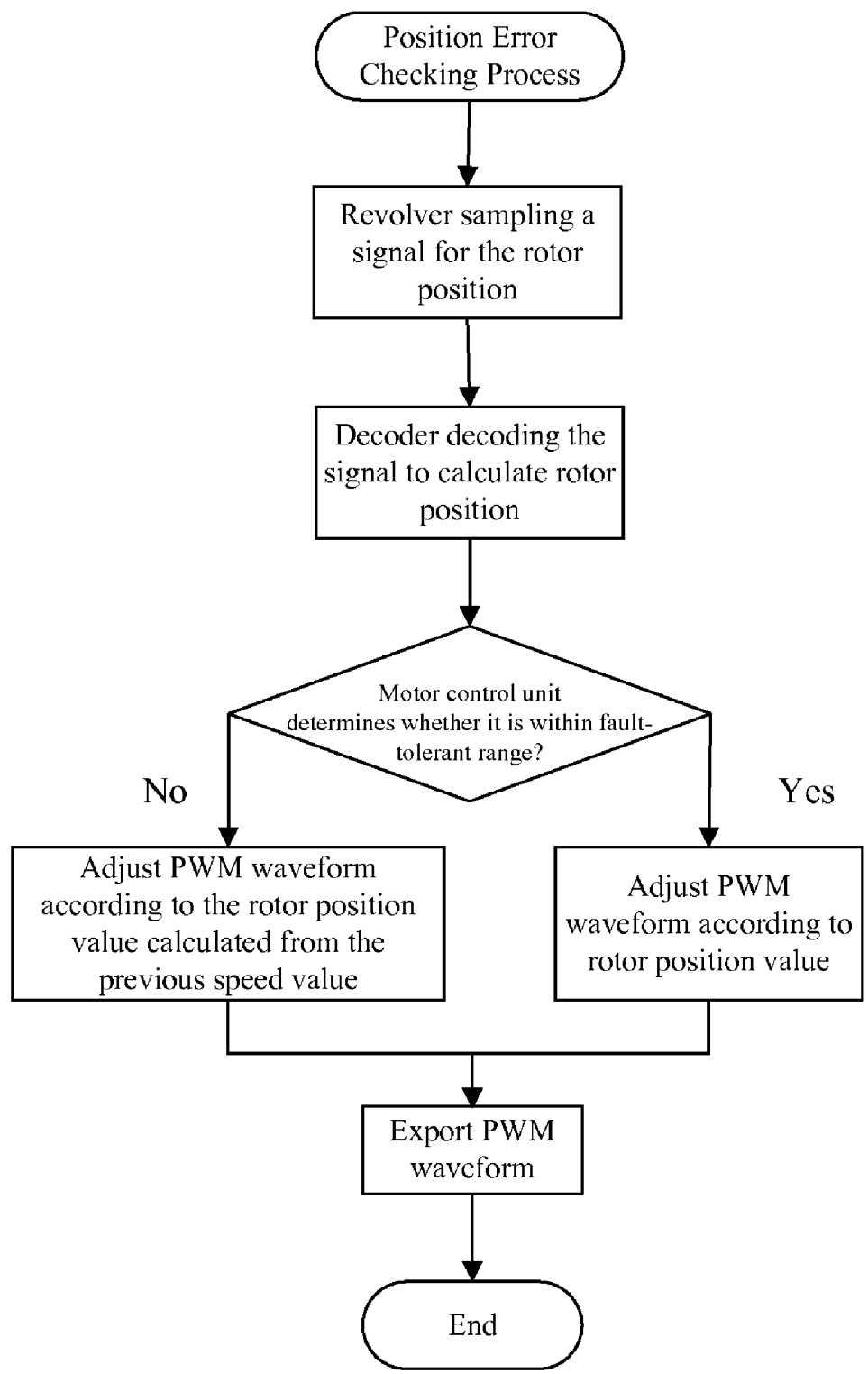
FIG. 2 is a control flow diagram of an embodiment of the present invention.

The main purposes of this invention are: to provide safe, stable, and reasonable motor control methods and motor rotor position detection fault-tolerant processing methods. When the electric vehicle motor rotor position detection is faulty, these methods can still determine a corresponding correct and reasonable stator voltage control strategy to prevent the electric motor operation from unsafe conditions or operations such as motor fluctuation or loss of control.

In order to realize the above purposes, first, the preferred embodiment of this invention provides electric vehicle motor control methods that include the following steps:

1) The motor rotor position is detected during a sampling cycle $T_1$ and a current rotor position angle $\theta_1$ is obtained.

2) The current rotor position angle $\theta_1$ is compared with the previous sampled rotor position angle $\theta_0$.

3) When the difference between the current position angle $\theta_1$ and the previous sampled rotor position angle $\theta_0$ exceeds the specified rotor angle limit, then the current sampled position angle $\theta_1$ is determined to be in error and thus it is discarded.

4) The correct speed value calculated from previous sampling period is used to correct the current sampled speed value; then the amended speed value is used to calculate a correcting value for the rotor position angle.

5) The rotor position angle correcting value is used to adjust the PWM waveform and change the three-phase voltage added on the motor to control motor operation.

In said step 1 of the above control method, the implementation of rotor position detection includes: a revolver is used to acquire motor rotor position signal that is then sent to a revolver decoding unit. Then the revolver decoding unit decodes the signal and calculates the current rotor position angle $\theta_1$.

In said step 4), the correct speed value calculated from the previous sampling period is used as the current sampled speed value. If the number of errors does not exceed the fault-tolerant limit within an assigned statistical time, then the counter clears and restarts to record at zero.

In said step 3), a counter starts to record at the first error incident and when the number of erroneous rotor position angle incidents reaches the fault-tolerant limit within an assigned statistical time, then it is determined that the hardware system failed.

Next, the present invention provides a type of electric vehicle rotor position detection fault-tolerant processing method includes the following procedures:

61) The current rotor position angle $\theta$ is compared with the previous sampled rotor position angle $\theta_0$.

62) When the difference between the current position angle $\theta_1$ and the previous sampled rotor position angle $\theta_0$ exceeds the specified rotor angle limit, then the current sampled position angle $\theta_1$ is determined to be in error and thus it is discarded.

63) The correct speed value calculated from previous sampling period is used to correct the current sampled speed value 64) The current speed value that is amended is used to calculate the current rotor position angle $\theta_1'$.

In said step 63), the correct speed value calculated from the previous sampling period is used as the current sampled speed value.

In said step 62), a counter starts to record from the first error incident and when the number of erroneous rotor position angle incidents reaches the fault-tolerant limit within an assigned statistical time, then it is determined that the hardware system failed. If the number of errors does not exceed the fault-tolerant limit within an assigned statistical time, then the counter clears and restarts to record from zero.

In the aforementioned fault-tolerance processing methods, the assigned statistical time is 3 minutes and the fault-tolerance frequency limit is 4.

In employing the above methods, in an electric vehicle equipped with this invention, the electric motor control ECU uses the current rotor position angle $\theta_1$ to compare with the previous rotor position angle $\theta_0$ to determine if the difference is within a reasonable range. Since the electric motor rotor position cannot have a sizable increase within a short period of time, therefore, it can be determined whether the current sampled rotor position is correct or not. If there is a sudden change in that position, the sampled position signal is determined to be in error and it is discarded. Then a fault-tolerant processing strategy is employed where the previous sampled rotor position $\theta_0$ is used as a base to determine the corrected current rotor position angle $\theta_1'$. Then a correcting value is used to control the electric motor. Thus, during the motor operation, when the detection of the motor rotor position is in error because of a sensor such as a revolver that is interfered by external conditions like electromagnetic fields or vibrations or when there is a breakdown in other related hardware portions or transmitting circuits, the fault-tolerance processing strategy of this invention can ensure safe operation by effectively preventing the motor from losing control and allow it to maintain its continuity and stability.

Through the addition of a timer to examine the frequency of failure occurrences, it can be determined when the detection of the motor rotor position is in error due to reasons such as where a sensor such as a revolver is interfered by external conditions like electromagnetic fields or vibrations or when there is a breakdown in related hardware components or transmitting circuits. Then the motor control unit can stop the motor operation to prevent further damage and ensure system safety.

The purpose of the embodiments of this invention is to provide motor rotor position control methods that aim to resolve an existing technology issue: when the motor rotor position continues to be in error, the sampled correct rotor position is directly used to control the motor which causes the motor rotational speed to increase at a greater pace. As a result, the change in the electric current may be large as well, leading to damages to power components.

The preferred embodiment of the invention may be performed by motor rotor position control methods having the following steps:

The sampled correct rotor position and the calculated rotor position obtained when there is an error are compared. Then whether the difference between the sampled correct rotor position and the calculated rotor position obtained when there is an error is greater than the particular specified motor rotor position limit is determined. If the difference between the sampled rotor position and the calculated rotor position obtained when there is an error (also referred to as calculatedwith-error rotor position) exceeds the specified motor rotor position limit, the sampled correct rotor position is discarded.

The summation between the calculated rotor position obtained when there is an error and the maximum value of its rotor position specified limit is computed. That summation is used as a correcting value to control motor operation.

Another purpose of the invention embodiment is to provide a type of motor rotor position control device. Said device include a correct rotor position comparing module that is used to compare the sampled correct rotor position and the calculated rotor position obtained when there is an error. It determines whether the difference between the sampled correct rotor position and the calculated rotor position obtained when there is an error is greater than the specified motor rotor position limit.

A correct rotor position processing module is used to discard the sampled correct rotor position when the difference between the sampled rotor position and the calculated-with-error rotor position exceeds the specified motor rotor position limit. In addition, a position correcting module is used to compute the summation between the calculated-with-error rotor position and the maximum value of the specified rotor position limit. That summation is used as a correcting value to control motor operation.

This invention embodiment compares the sampled correct rotor position with the calculated-with-error rotor position. When the difference between the sampled correct rotor position and the calculated-with-error rotor position exceeds the particular specified rotor position limit, then the sampled correct rotor position is discarded. Then the summation between the calculated-with-error rotor position and the maximum value of the specified rotor position limit is computed. That summation is used as a correcting value to control the motor operation. This invention solves the existing technology issue where the sampled rotor position is used directly to control the motor when the rotor position continues to be in error.

FIG. 1 is a simplified structural diagram of the electrical motor system of an electric vehicle that is an embodiment of this invention. As shown in the figure, the electric vehicle electric driver system of the embodiment includes: a battery pack 1, an inverter unit 2, a revolver decoding unit 3, an optoisolator 4, a motor control unit 5, an electric motor 6, and a revolver 7.

Among them, the battery pack 1 uses a high-power battery pack with a voltage 200V-330V which is the energy source of the entire electric driver system. The motor control unit 5 is used to calculate the PWM signal which is sent to the inverter 2 through the driver isolation unit. The inverter 2 is comprised of three IPM (IGBT can also be used as a type of power components transistors). The IPM is divided into top and bottom bridges and the three IPM top bridge input is connected to the positive terminal of the battery pack 1. The bottom bridge is connected to the negative terminal of battery pack 1. Each connection point between each IPM is connected to the three-phase coil (U-phase, V-phase, W-phase) of the electric motor 6. The electric motor 6 is a PMSM (permanent magnetism synchronous machine) that is used as the electric vehicle power output source. The revolver 7 is connected to the electric motor 6 rotor and is used to detect the rotational angle position of the electric motor 6 rotor and send the position to the revolver decoding unit 3. The revolver decoding unit 3 receives the signal from the revolver 7 to decode the rotor position and sends it to the connected motor control unit 5.

The electrical installations process of this invention for the electric vehicle is as follows:

Through experiments and based on the current measured speed, the maximum value that the vehicle can accelerate or slow down in the next moment is measured to achieve a statistically reasonable range or value. This value correspondingly becomes the maximum rotor angle change that is used as the specified rotor angle limit. In operation, the revolver detects the motor rotor position during a sampling cycle $T_1$. Its detected signal is sent to the revolver decoding unit. The revolver decoding unit is responsible for decoding that signal to calculate the current rotor position $\theta_1$. This position value is sent to the motor control unit where it is compared with the previous sampled rotor position angle $\theta_0$. If the current sampled position signal is not within the specified rotor angle limit based on the previous position signal, then the current revolver sampled data is considered an error because the rotor position cannot have a steep change within a very short sampling period. From the outside view, the vehicle cannot have a sudden speed change within a short period of time. If the PWM waveform used to control the motor is based on the current sampled data, the vehicle control can become unstable. For instance, if the revolver sampled data is in error when the vehicle advances in the D (drive) block, the decoded rotor angle may appear to be in reverse. In other words, if the control PWM waveform is computed based on erroneous position data, then the entire vehicle can be in great danger which is not a desired situation. Therefore the sampled data processing is based on a judgment of erroneous data. Based on the reason that the rotor position cannot have sudden changes, that particular data is discarded when the revolver sampled data is in error. But in the mean time, a control waveform must still be given to ensure the motor is not out of control and unstable condition does not occur. Based on the above reasons, since the sampling period in this example is extremely short which is 20 μm and it is during this short period of time that the vehicle speed cannot have sudden changes, therefore the correct speed value calculated from the previous sampling period is used to replace the current sampling calculated speed value. This will not affect the accuracy of the overall calculation. On the contrary it can help calculate the rotor position for this very moment which in turn can ensure control continuity and stability. This corrected angle value is used to adjust the PWM waveform and change the voltage provided to the motor three-phase to control the motor operation.

Meanwhile, external interferences should not frequently cause the revolver to have erroneous sampled rotor position signal. In actual experiments, by exerting interferences on the controller, the number of errors is less than 4 times in three minutes. This can be considered an extreme coincidental condition. Moreover, if there is a hardware breakdown, the frequency of error is greater than 4 times since the sampled data can be in error every time. When deciding on the statistical time period, a shorter period is also taken into consideration; however, too short of a period can cause a greater probability of misjudgment that can lead to faulty protection. If the period is too long, that is the statistical time period is too long, it can also increase the risk to the vehicle. Even though the hardware has a problem and it may not be maintained for a period of time, this type of hardware damage increases the risk in control safety, which can be extremely harmful. Therefore, there is a timer installed in the system in this example; the timer starts to record when the first revolver error occurs. If the number of errors in the rotor position signal sampled by the revolver within the three minute specified statistical time reaches the fault-tolerant frequency limit of 4 times, this means that there may be a problem in revolver hardware system or other related hardware components or transmitting circuits. At this point, the system can no longer calculate the rotor position and it should send out a revolver error signal to the motor control unit so that the motor control unit can stop the motor operation in time. Thus, it can prevent greater loss and ensure system safety. If within the specific statistical time the number of errors in the revolver does not exceed the fault-tolerant frequency limit, then the timer restarts to count again and the revolver record of error also resets.

Based on the implementation of this invention on a vehicle, during the motor operation process, even though the revolver can have errors in detecting the motor rotor position due to external electromagnetic and vibration types of interferences, but through the control strategy of this invention, the revolver error handling is very effective in preventing the motor from losing control and ensuring the safety of the vehicle ride.

Furthermore, another embodiment of the present invention compares the sampled correct rotor position with the calculated rotor position obtained when there is an error (or "calculated-with-error rotor position"). When the difference between the sampled correct rotor position and the calculated-with-error rotor position exceeds than the specified rotor position limit, then the sampled correct rotor position is discarded. It then computes the summation between the calculated-with-error rotor position and the maximum value of the specified rotor position limit. That summation is used as a correcting value to control the motor operation.

Figure 3:
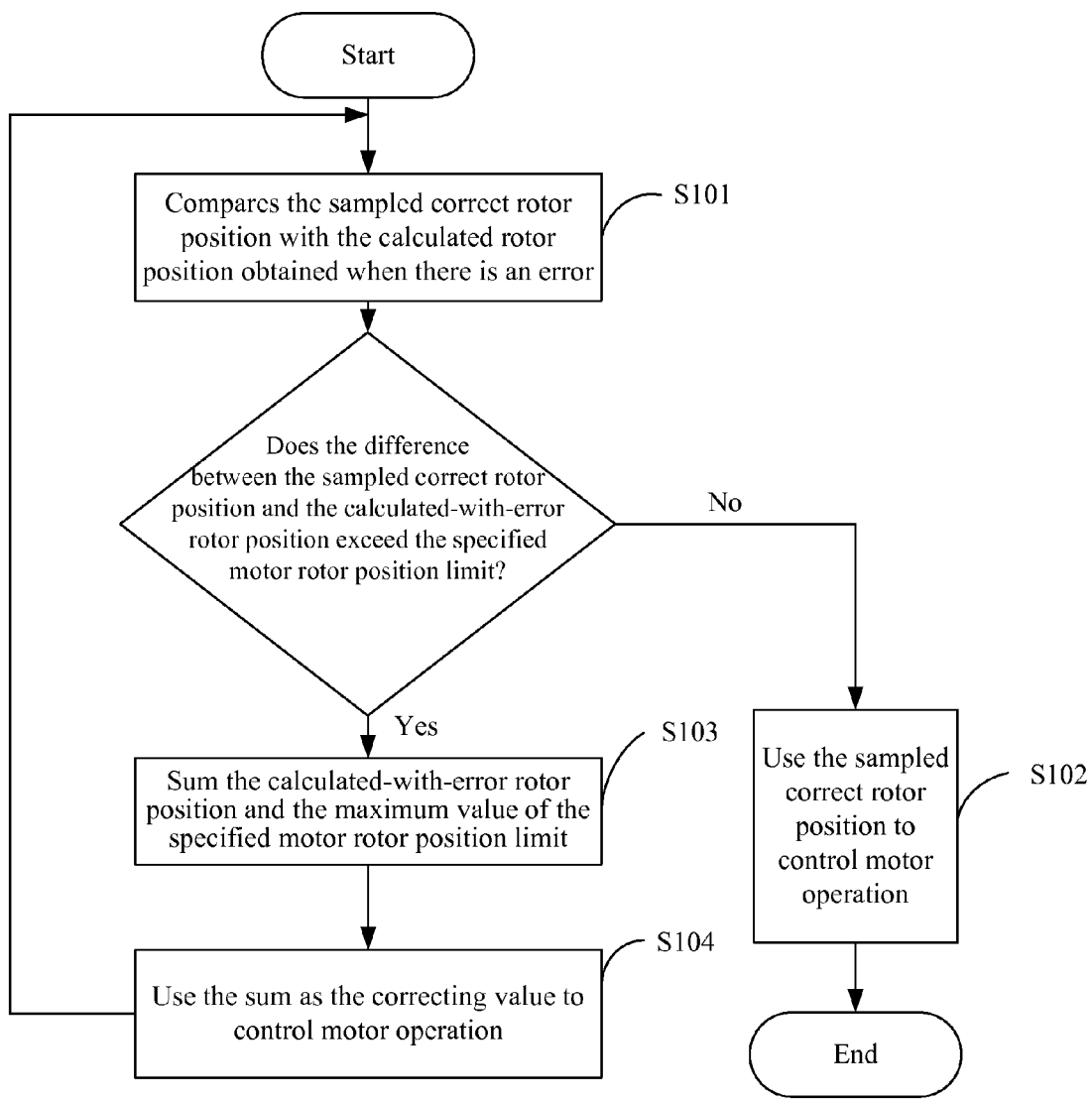
FIG. 3 is a flow chart of the motor rotor position control method provided by an embodiment of this invention.

FIG. 3 shows a flow of the motor rotor position control method provided by an embodiment of this invention. In step S101, it compares the sampled correct rotor position with the calculated-with-error rotor position. It then determines whether the difference between the sampled correct rotor position and the calculated-with-error rotor position is greater than the specified motor rotor position limit.

During the sampling cycle, the revolver can detect the motor rotor position angle signal and through the decoder the value of the motor rotor position can be obtained.

When the motor rotor position continues to be in error, through existing technology, the current motor rotor position can be calculated. When the correct motor rotor position appears, the correct rotor position is acquired.

During the implementation process, that correct motor rotor position and the calculated rotor position obtained when there is an error are acquired through the revolver internal decoding chip. In that decoding chip, it has a signal pin that can indicate the reception of the correct rotor position once the correct rotor position appears.

By comparing the sampled rotor position and the calculated-with-error rotor position that is acquired after the revolver is back to normal, it can be determined if the difference is greater than the specified motor rotor position limit. In other words, it determines if the difference between the two values exceeds its motor rotor maximum variation value. The calculated-with-error rotor position is the calculated-with-error motor rotor position obtained just before acquiring the correct rotor position.

During the implementation process, the maximum value is obtained by carrying out motor experiments. That is through testing the different position value that the particular motor can withstand. When the value exceeds the maximum value, it will cause an overly large electric current that can result in damages to the motor power components. The worst maximum value is related to the difference value that can be tolerated by the power components connected to that motor. When that maximum value is exceeded, it can cause abnormal power components operation. Certainly, that maximum value is also linked to the passenger riding comfort; if the maximum value is too large, the riding comfort is not as good to the passengers.

When the difference between the sampled correct rotor position and the calculated-with-error rotor position does not exceed the specified motor rotor position limit, step S102 is processed and the sampled correct rotor position is used to control the motor operation.

During the implementation process, it is common that the difference between sampled correct rotor position and the calculated-with-error rotor position does exceed the specified motor rotor position limit. Then at this time, the current sampled correct rotor position is determined to be in error and the current sampled correct rotor position is discarded.

After the current correct rotor position is determined to be in error, step S103 is processed. It computes the summation between the calculated-with-error rotor position and the maximum value of the specified motor rotor position limit.

In step S104, it uses the summation value as the correcting value to control the motor operation. In other words, it uses that value to adjust the PWM waveform to change the three-phase voltage added on the motor to control the motor operation.

During the implementation process, the next time when the motor rotor position continues to be in error and acquires a correct rotor position, it uses that value as the calculated-with-error rotor position and continues to compare it to the current sampled correct rotor position when there is an error.

For instance, if the motor rotor position continues to be in error, the revolver internal decoding chip acquires a correct rotor position. The decoding chip interior has a signal pin which indicates the correct rotor position has been obtained once the correct rotor position appears. If the sampled correct rotor position is 2000, before acquiring the correct rotor position which is also when the motor rotor position continues to be in error, the calculated rotor position is 1800. The specified motor rotor position limit maximum value is 80. The calculated value is 2000−1800=200 which is greater than the specified motor rotor position limit maximum value of 80. At this time, it uses the summation of the calculated rotor position obtained when there is continuous fault which is 1800 and the maximum value of the motor rotor position specified limit which is 80 to control the motor operation at 1880. Since the difference between 1880 and 1800 does not exceed the maximum value of the specified motor rotor position limit, by using 1880 to control the motor will not cause a jump in the increase in the motor rotational speed, resulting in a smaller change in the electric current.

During the next cycle, that is when the motor rotor position continues to be in error and acquires a correct rotor position, it uses the summation obtained from the previous calculation as the calculated-with-error rotor position. The summation continues to be compared with the correct rotor position sampled during this cycle. If the current sampled correct rotor position is 2005, thus 2005−1880=125 which is still greater than the specified motor rotor position limit maximum value of 80, then it continues to use 1880+80=1960 to control the motor operation.

If the sampled correct rotor position for the next cycle is 2010, the difference between 2010 and 1960 is 50 which does not exceed the specified motor rotor position limit maximum value of 80. Then the sampled correct rotor position 2010 is used to control the motor operation.

Therefore, by using the above procedure when the motor rotor position changes from continuously being in the error state to being in the correct state, the sampled correct motor rotor position is assessed and corrected. It helps to prevent the motor electric current and rotational speed from having sudden changes. It can also ensure the motor control continuity and can improve the comfort of the vehicle ride.

Figure 4:
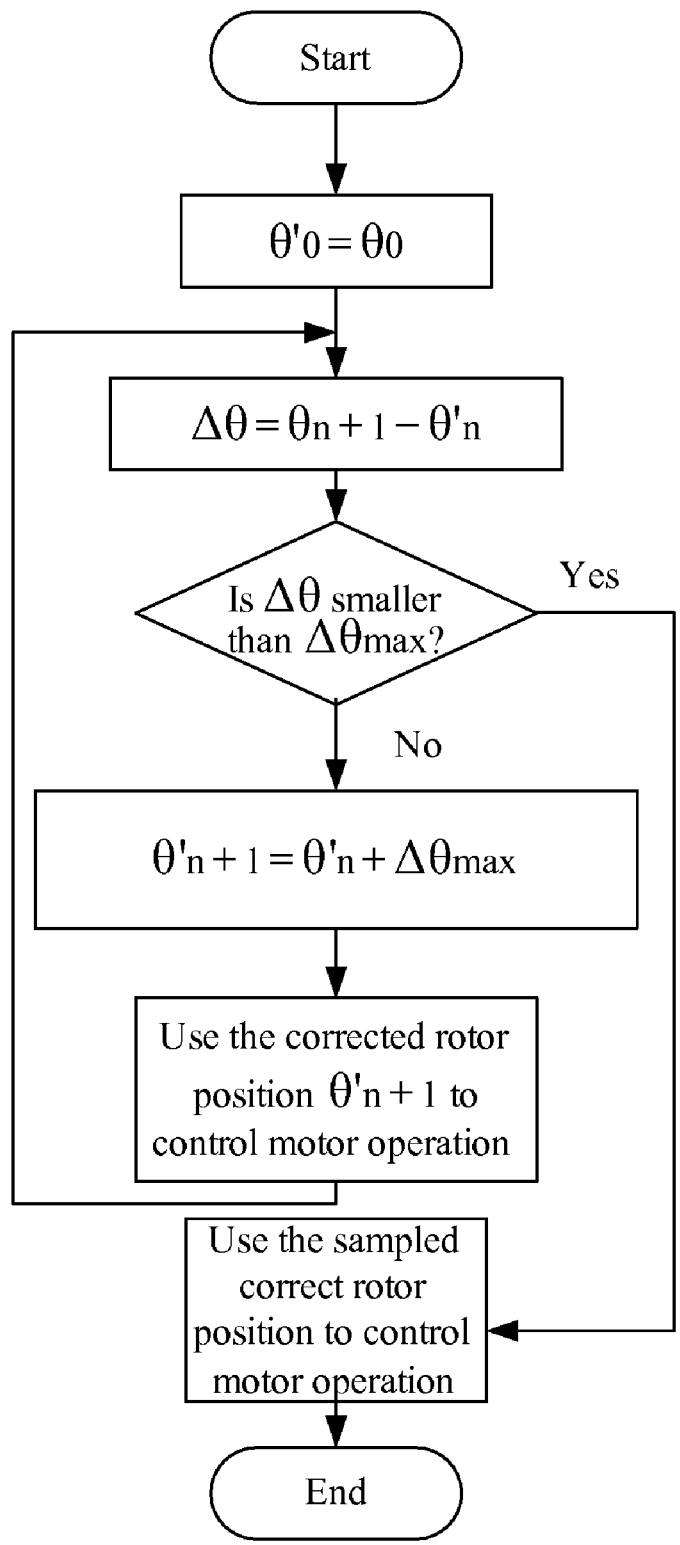
FIG. 4 is a flow chart of the motor rotor position control method implementation example provided by an embodiment of this invention.

For example, FIG. 4 shows the flow diagram of an embodiment of this invention where n is the starting value for the motor rotor position when a correct rotor position is sampled. If n=0, after an error is detected in the motor rotor position, since the calculated-with-error motor rotor position is $\theta_0$, then the correct motor rotor position sampled after the error is $\theta_1$. Therefore, the difference between the two sampled motor rotor positions can be calculated as $\Delta\theta$.

Moreover, the maximum value for the electric current rate of change that motor can withstand is determined through experiment testing. When this maximum value is exceeded, it can lead to damages to the power components. Thus through the maximum value for the electric current rate of change, it can determine the scope of the position difference $\Delta\theta$ that this particular motor rotor position can withstand.

When the motor position sampled by the revolver of that particular motor is detected to be continuously in error, then the calculated position of that motor is $\theta_0$. After the correct rotor position $\theta_1$ is sampled, this correct rotor position $\theta_1$ is then compared with the previous calculated rotor position $\theta_0$ obtained when there is an error resulting in $\Delta\theta_1$, where $\Delta\theta_0=\theta_1-\theta_0$.

Then the $\Delta\theta_0$ is compared with the maximum of the preset $\Delta\theta$, $\Delta\theta_{max}$. If it is smaller than maximum value $\Delta\theta_{max}$, then the correct rotor position $\theta_1$ can be used directly as the sampled value to control that particular motor.

During the implementation process, that $\Delta\theta_0$ value is usually greater than the maximum value $\Delta\theta_{max}$. Thus, the correct rotor position $\theta_1$ that is used to control the motor must be corrected:

$$\theta_1'=\theta_0+\Delta\theta_{max}$$

This amended value is used as the correcting value to control that particular motor operation.

The above process should be repeated next time when there is an error and the correct motor rotor position is sampled. This correct motor rotor position continues to be compared with the previous calculated-with-error rotor position. That calculated motor rotor position obtained when it is wrong becomes the summation calculated for this time. The difference between the two values is determined whether it is within the scope of the specified rotor position limit. If the difference is greater than $\Delta\theta_{max}$, the correction process continues.

When the difference $\Delta\theta$ between the sampled correct rotor position and the calculated-with-error rotor position is within the specified limit, then the correction of the motor rotor position stops and the sampled correct rotor position is used directly to control the motor operation.

Certainly, FIG. 4 only shows a process cycle of an embodiment of this invention after the correct rotor position is sampled. When the next correct rotor position is obtained, the starting value n begins a new cycle from 0. For example, the equation can be calculated as follows:

when $n=0$, $\Delta\theta=\theta_1-\theta'_0=\theta_1-\theta_0$, $\theta'_1=\theta_0+\theta_{MAX}$;

when $n=1$, $\Delta\theta=\theta_2-\theta'_1=\theta_2-(\theta_0+\theta_{MAX})$, $\theta'_2=\theta'_1+\theta_{MAX}$; and when $n=2$, $\Delta\theta=\theta_3-\theta'_2=\theta_3-(\theta_0+\theta_{MAX}+\theta_{MAX})$, $\theta'_3=\theta'_2+\theta_{MAX}$.

Figure 5:
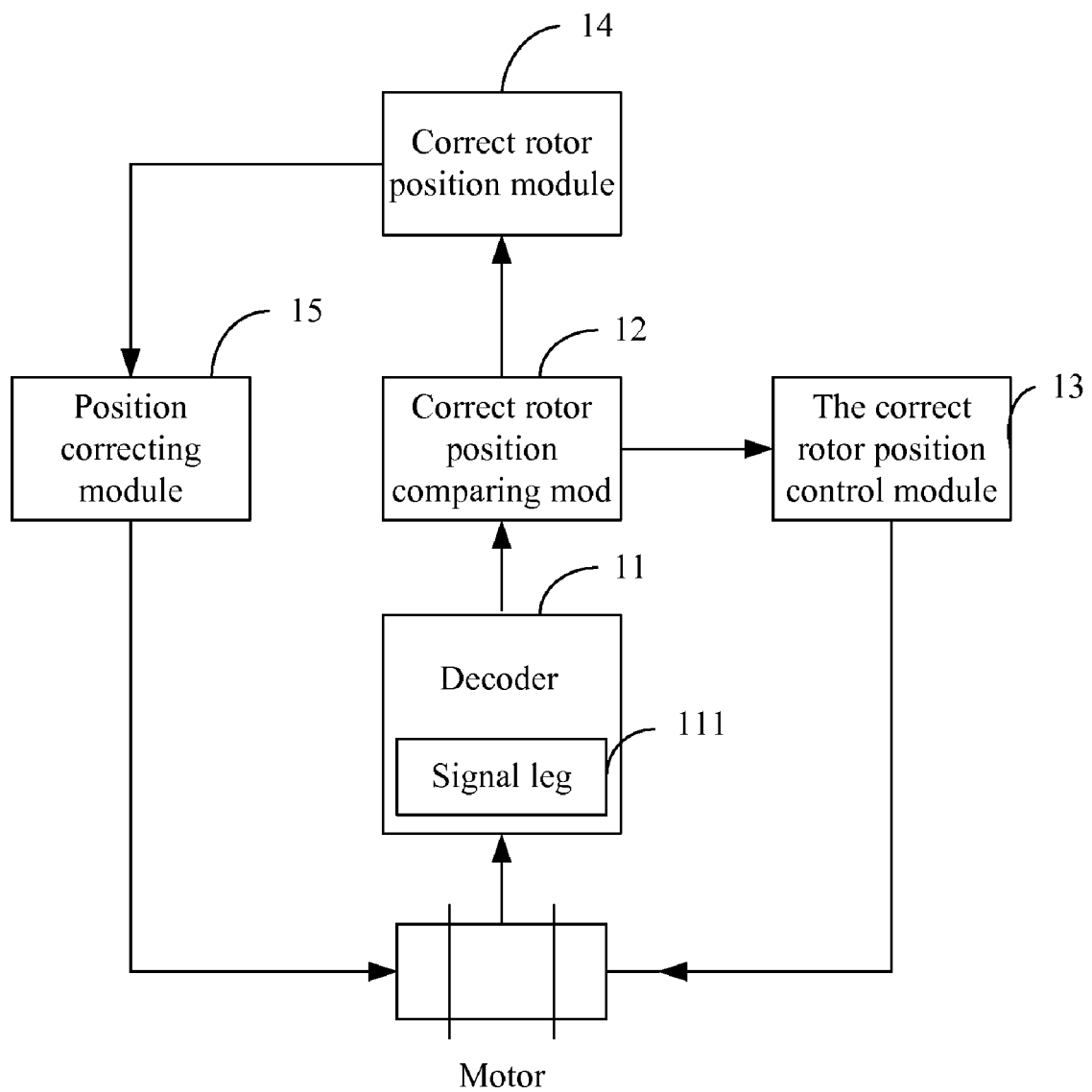
FIG. 5 is a structural diagram of a motor rotor position control device provided by an embodiment of this invention.

FIG. 5 shows a structure of the motor rotor position control devices provided by an embodiment of this invention. When the motor rotor position continues to be in error, through the existing technology, the current motor rotor position is calculated. Moreover, the rotor position is continuously calculated and when a correct motor rotor position appears, that correct motor rotor position is sampled.

During the implementation process, that correct motor rotor position and the calculated rotor position when there is an error are sampled through the resolver's internal decoding chip 11. In that decoding chip, it has a signal pin that can indicate the reception of the correct rotor position once the correct rotor position appears.

The correct rotor position comparing module 12 compares the sampled correct rotor position and the calculated-with-error rotor position. Then it determines whether the difference between the sampled correct rotor position and the calculated-with-error rotor position is within that specified motor rotor position limit.

When the difference between the sampled correct rotor position and the calculated-with-error rotor position does not exceed the specified motor rotor position limit, then the correct rotor position control module 13 uses that sampled correct rotor position as the control value for the motor rotor position.

When the difference between the sampled correct rotor position and the calculated rotor position obtained when it is wrong exceeds the specified motor rotor position limit, the correct rotor position processing module 14 discards the sampled correct rotor position. At this time, the position correcting module 15 calculates the summation between the calculated-with-error rotor position and the maximum value of the specified motor rotor position limit. That summation is used as the correcting value to control the motor operation.

When the motor rotor position is detected to be in error continuously and that the correct rotor position is sampled, the embodiment of this invention compares the sampled correct rotor position with the calculated-with-error rotor position. When the difference between the sampled correct rotor position and the calculated-with-error rotor position exceeds the specified motor rotor position limit, then the sampled correct rotor position is discarded. The summation between the calculated-with-error rotor position and the maximum value of the motor rotor position specified limit is calculated. That summation is used as the correcting value to control the motor operation. This invention solves an existing technology issue where the sampled rotor position is used directly to control the motor when the rotor position is in error continuously. This results in a greater increase in the motor rotational speed leading to an overly large electric current rate of change that causes damage to power components.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A method for controlling an electric motor of a vehicle, comprising the steps of:
    detecting a current rotor position angle during a current sampling cycle;
    comparing said current rotor position angle with a previous sampled rotor position angle;
    if the difference between the current rotor position angle and the previous sampled rotor position angle exceeds a specified rotor angle limit, calculating a correcting value as a function of one or more values from a previous sampling cycle, comprising the substeps of summing the previous sampled rotor position angle and the specified rotor angle limit; and using said sum as the correcting value; and adjusting the voltage to the motor as a function of the correcting value.

2. The method of claim 1 wherein said correcting value is calculated by the steps of:

using a speed value calculated from a previous sampling cycle as the current sampled speed value; and calculating said correcting value as a function of the current sampled speed value.

3. The method of claim 1, further comprising the steps of:
counting the number of one or more error incidents; and
when the number of error incidents reaches a fault-tolerant limit within an assigned statistical time period, determining a hardware system failure has occurred.

4. The method of claim 3, further comprising the step of:
if the number of error incidents does not exceed the fault-tolerant limit within the assigned statistical time period, restarting the counting of the number of one or more error incidents from zero.

5. The method of claim 4 wherein the assigned statistical time period is 3 minutes and the fault-tolerant limit is 4.

6. The method of claim 1, further comprising the steps of:
counting the number of one or more error incidents; and
when the number of error incidents reaches a fault-tolerant limit within an assigned statistical time period, determining a hardware system failure has occurred.

7. The method of claim 6, further comprising the step of:
if the number of error incidents does not exceed the fault-tolerant limit within the assigned statistical time period, restarting the counting of the number of one or more error incidents from zero.

8. The method of claim 7 wherein the assigned statistical time period is 3 minutes and the fault-tolerant limit is 4.

9. A method for controlling a motor, comprising the steps of:

determining a sampled correct rotor position and a calculated-with-error rotor position;

if the difference between the sampled correct rotor position and the calculated-with-error rotor position is greater than a specified rotor position limit, discarding the sampled correct rotor position, computing the sum between the calculated-with-error rotor position and a maximum value of the specified motor rotor position limit, and using the sum as a correcting value to control the motor, else using the sampled correct rotor position as the correcting value to control the motor; and adjusting the voltage to the motor as a function of the correcting value.

10. The method of claim 9 wherein the sampled correct rotor position and the calculated-with-error rotor position are obtained through the use of a revolver.

11. The method of claim 9 wherein when the rotor position continues to be in error, the calculated value from the last cycle is used as the calculated-with-error rotor position for the current cycle.

12. A method for controlling an electric motor of a vehicle, comprising the steps of:

detecting a current rotor position angle $\theta_1$ during a current sampling cycle $T_1$;

comparing said current rotor position angle $\theta_1$ with a previous sampled rotor position angle $\theta_0$;

if the difference between the current rotor position angle $\theta_1$ and the previous sampled rotor position angle $\theta_0$ exceeds a specified rotor angle limit, summing the previous sampled rotor position angle and the specified rotor angle limit; and using said sum as the correcting value; and adjusting the voltage to the motor as a function of the correcting value;

counting the number of one or more error incidents; and
when the number of error incidents reaches a fault-tolerant limit within an assigned statistical time period, determining a hardware system failure has occurred.

13. The method of claim 12 wherein said correcting value is calculated by the steps of:

using a speed value calculated from a previous sampling cycle as the current sampled speed value; and calculating said correcting value as a function of the current sampled speed value.

14. The method of claim 12, further comprising the step of:
if the number of error incidents does not exceed the fault-tolerant limit within the assigned statistical time period, restarting the counting of the number of one or more error incidents from zero.

15. The method of claim 14 wherein the assigned statistical time period is 3 minutes and the fault-tolerant limit is 4.

16. The method of claim 13, further comprising the steps of:

counting the number of one or more error incidents; and
when the number of error incidents reaches a fault-tolerant limit within an assigned statistical time period, determining a hardware system failure has occurred.

17. The method of claim 16, further comprising the step of:
if the number of error incidents does not exceed the fault-tolerant limit within the assigned statistical time period, restarting the counting of the number of one or more error incidents from zero.

18. The method of claim 17 wherein the assigned statistical time period is 3 minutes and the fault-tolerant limit is 4.

* * * * *